J. GOCH.
FABRIC LAYING AND CUTTING MACHINE.
APPLICATION FILED OCT. 15, 1919.
1,354,614.
Patented Oct. 5, 1920.
4 SHEETS—SHEET 3.
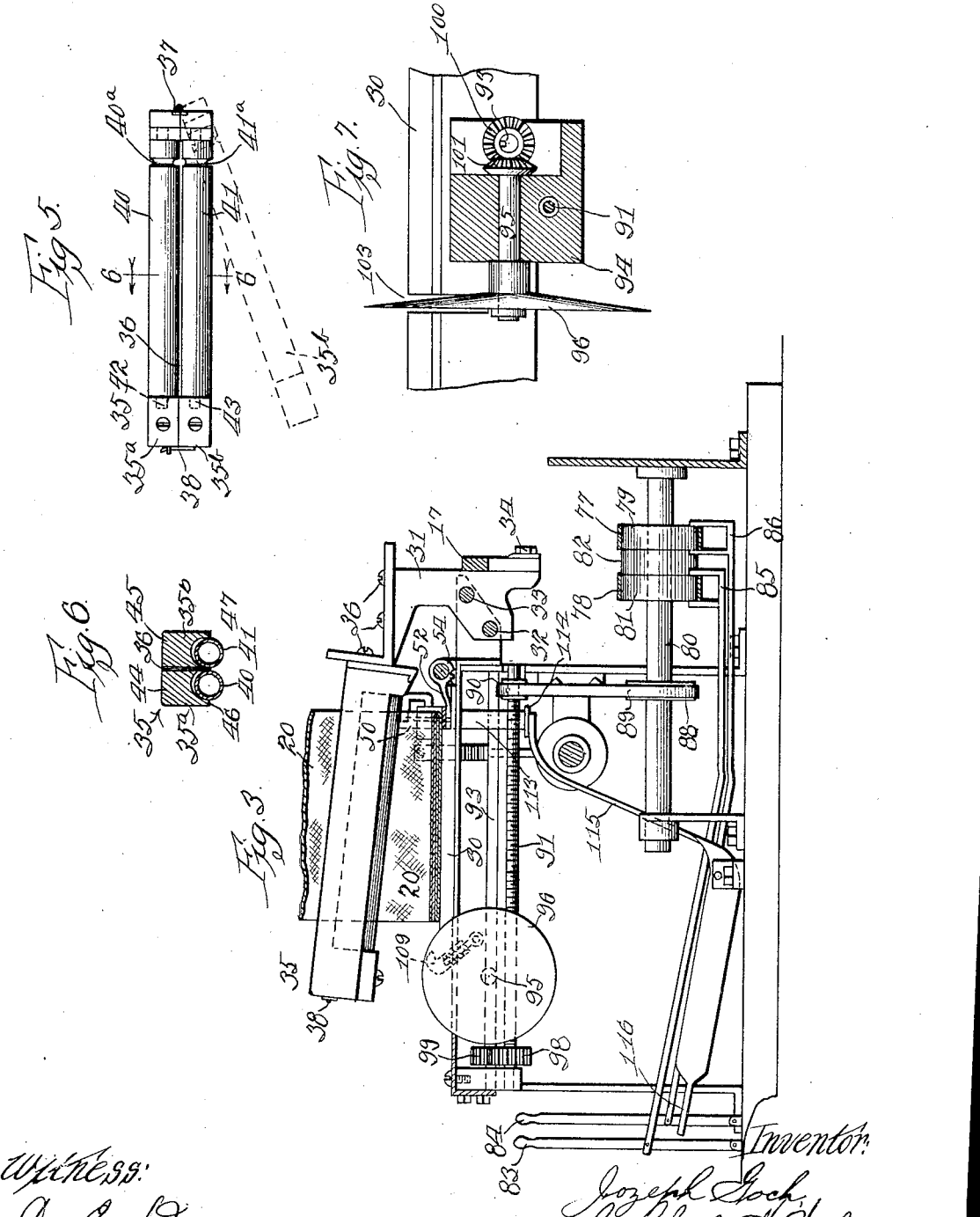

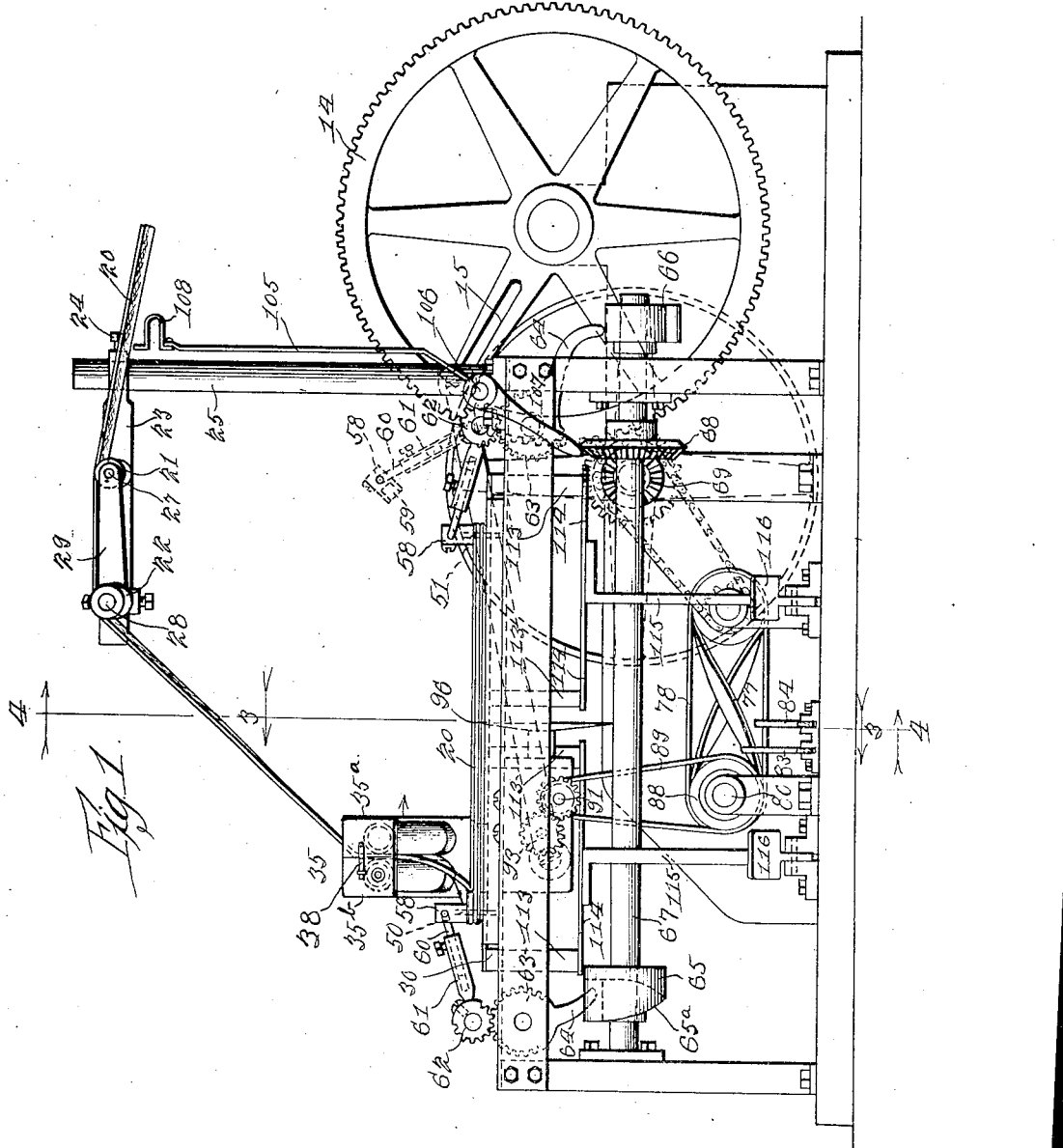

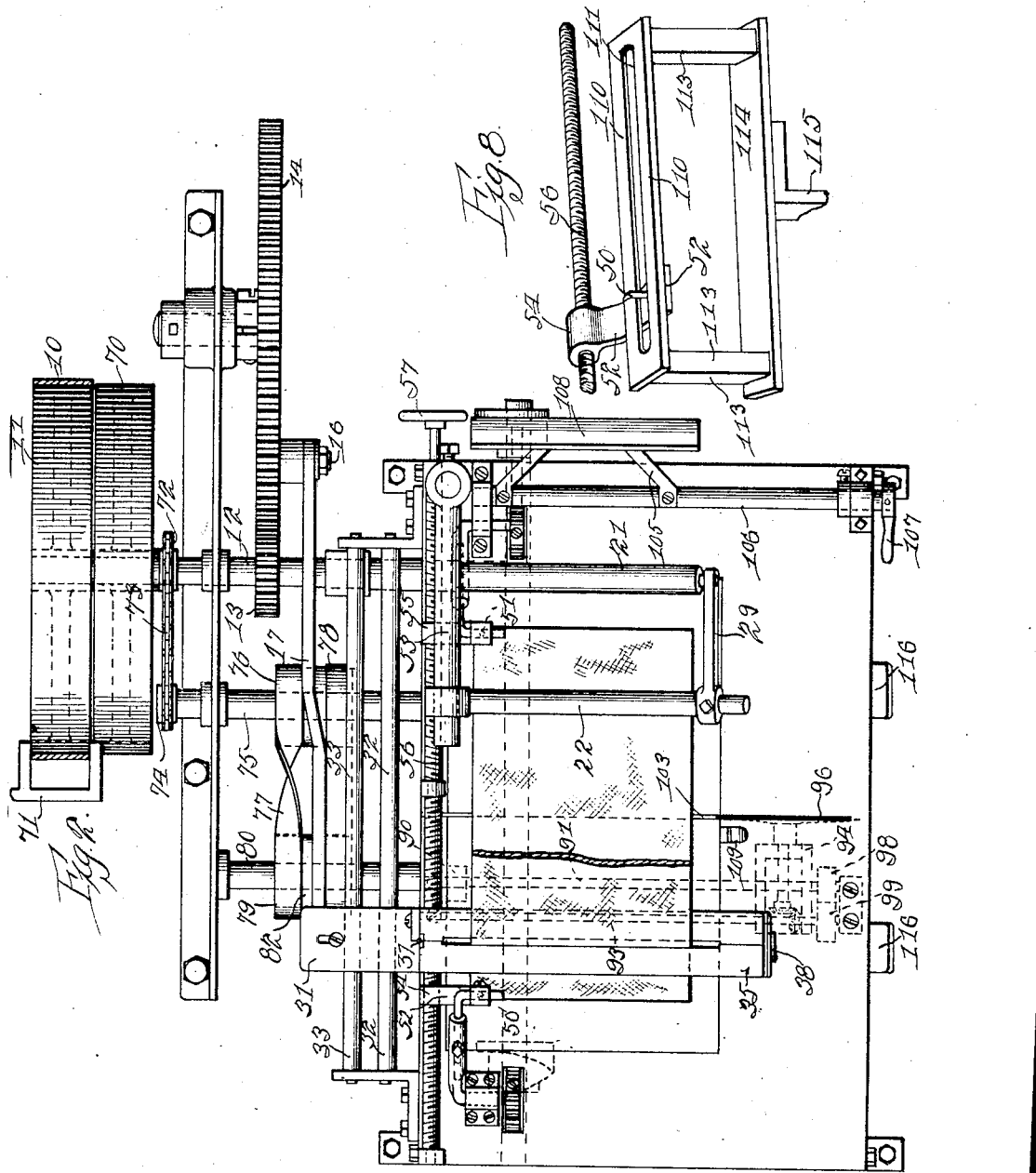

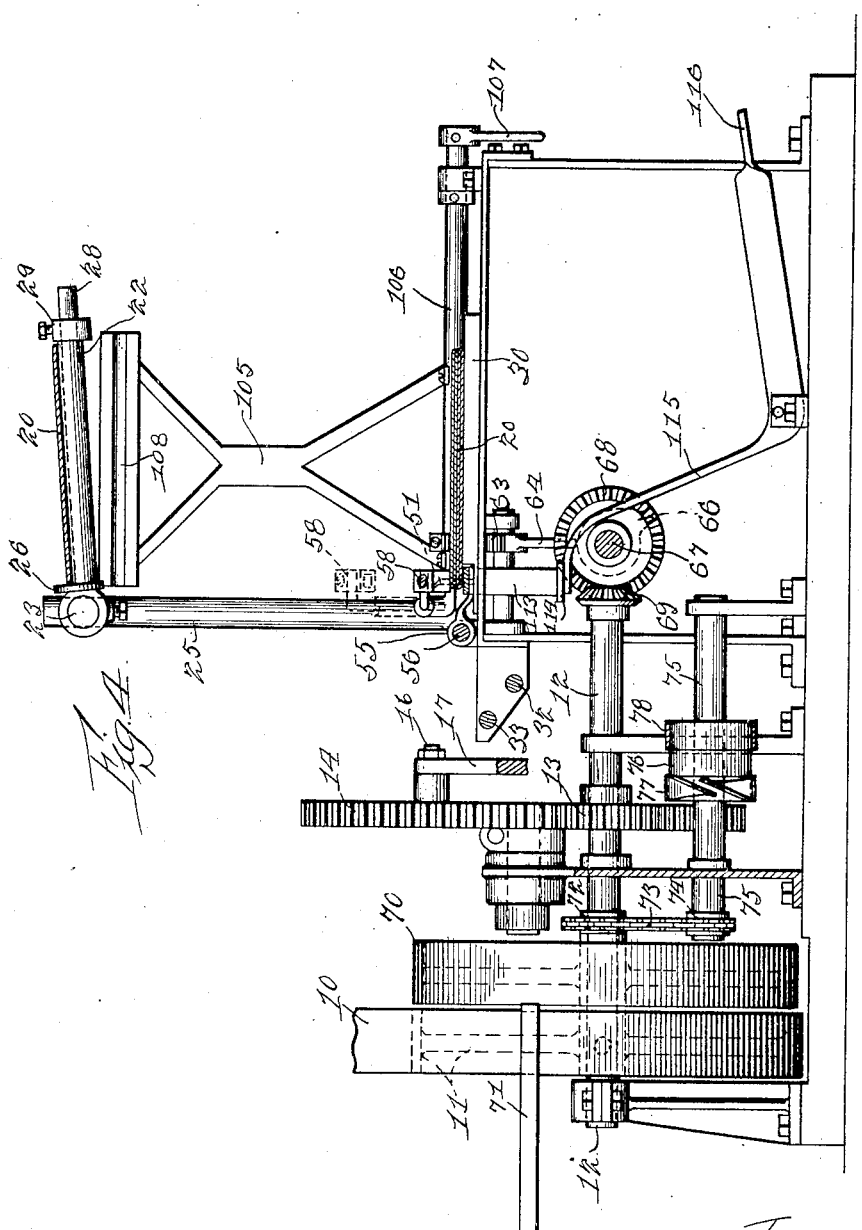

UNITED STATES PATENT OFFICE.

JOZEPH GOCH, OF CHICAGO, ILLINOIS.

FABRIC LAYING AND CUTTING MACHINE.

1,354,614.
Specification of Letters Patent.
Patented Oct. 5, 1920.

Application filed October 15, 1919. Serial No. 330,809.

*To all whom it may concern:*

Be it known that I, JOZEPH GOCH, having made application for naturalization as a citizen of the United States, formerly a subject of the Czar of Russia, residing at Chicago, in the county of Cook and State of Illinois, have invented certain new and useful Improvements in Fabric Laying and Cutting Machines, of which the following is a specification.

My invention relates to machines for laying fabric in plies and then cutting the same intermediate the ends of the plies, and has particular importance in the bag-making industry. Its principal object is to provide in a single machine means for automatically laying plies until the desired thickness thereof is had, and means for cutting the plies through the automatic operation of the machine, whereby it is only necessary for the operator to shift levers to put the laying and cutting mechanisms into operation, and to discontinue the same, thus obtaining the desired result in a simple and easy manner. A specific object is to provide improved means for holding the ends of the plies while being laid, and means for releasing the fabric from these holding means. Other specific objects are to provide improved means for laying the fabric, and also for cutting the same, and for laying and cutting plies of various lengths. Still other objects and advantages will appear hereinafter.

In the accompanying drawings, which form a part of this specification, Figure 1 is a front elevation of the machine; Fig. 2 is a top plan; Figs. 3 and 4 are transverse sections on the common line 3—3 and 4—4 of Fig. 1, as viewed respectively in the directions of the arrows; Fig. 5 is a bottom view of the slotted arm of the laying mechanism, the dotted line showing one part of the arm moved away from the other for inserting and removing the fabric; Fig. 6 is a transverse section on the line 6—6 of Fig. 5; Fig. 7 is a partly sectional detail showing the cutting knife and certain operating mechanism therefor; and Fig. 8 is a perspective view of details of one of the two fabric-holding and releasing mechanisms.

*Fabric laying mechanism.*—Referring to Fig. 4, power for operating the machine is provided from a belt 10 upon the pulley 11 rigidly secured to the shaft 12 carrying rigidly the pinion 13 intermeshing with the pitman gear 14. One spoke of the gear wheel 14 has the slot 15 (Fig. 1) and within this slot 15 is adjustably mounted the crank pin 16 carrying the pitman 17.

Referring to Fig. 1, the fabric 20 comes to the machine from any suitable source, such as a roll thereof (not shown) and passes over a pair of rollers 21 and 22 carried by a support 23 adjustably held by the set screw 24 upon the standard 25. From Fig. 4 it will be observed that these rollers 21 and 22 are inclined so that the fabric 20 will maintain its engagement with the guiding flange 26 on the roller 22 and thus preserve the edge of the fabric with a constant line of travel to the laying mechanism below it. These rollers 21 and 22 are in the form of metal tubes loosely mounted upon the shafts 27 and 28 respectively and the outer or free ends of these shafts are supported by a connecting piece 29 held by a set screw upon the shaft 28.

A table or support 30 is provided upon which the fabric is to be laid in plies. A carrier 31 is mounted to reciprocate upon two spaced-apart shafts 32 and 33 secured at their ends to frame parts of the machine. The pitman 17 is connected with this carrier 31 by the bolt 34 (Fig. 3). The fabric-laying arm 35 is rigidly secured to the carrier 31 by bolts 36 (Fig. 3). When the pitman gear 14 is rotated the laying arm 35 is moved back and forth over the table 30.

The fabric-laying arm 35 comprises two parts, 35ᵃ and 35ᵇ (Figs. 5 and 6), these arm parts being spaced apart intermediate their ends to provide a slot-like opening 36 to accommodate the fabric 20 between them. These arm parts are also hinged together at one end by the hinge 37, permitting their separation for admitting and removing the fabric. A spring catch 38 at the end opposite the hinge holds these parts together when the machine is in use.

The arm parts 35ᵃ and 35ᵇ include a pair of rollers 40 and 41 mounted upon shafts 42 and 43 respectively. The rollers are carried by supporting parts 44 and 45, which may suitably be made of wood and serve as partial housings for the rollers 40 and 41 respectively, as well illustrated in Fig. 6, from which it will be seen that the upper half of these rollers are within the body of the supporting and covering parts 44 and 45 respectively. This construction provides against strands of the fabric becoming wound upon these rollers 40 and 41, which winding would seriously interfere with the operation of the laying mechanism, and the beneficial result thus attained comes through the substantially close fit between the rollers 40 and 41 and the parts 46 and 47 respectively of the housings, these parts 46 and 47 being in substantially frictional contact with the rollers and serving to exclude the strands there.

In order to hold the fabric 20 upon the table 30 while it is being laid by the reciprocating arm 35 I provide a pair of sharply pointed pins 50 and 51 which are carried by arms 52 and 53 respectively, terminating in heads 54 and 55 respectively, which are screw threaded for engagement with the right- and left-threaded screw shaft 56 operated by the hand wheel 57 (Figs. 2 and 8). From this construction it will be plain that the sharp pins 50 and 51 may be moved closer together or farther apart as desired so as to engage the ends of shorter or longer plies.

These pins 50 and 51 catch the ends of the plies when the laying device 35 in its reciprocating movement brings the material to them. In order, however, that the ends of the plies may be held rigidly and securely during the laying operation, and at the same time be compacted upon each other, and so that a materially large number of plies may be held by comparatively short pins I provide a presser foot device for each pin comprising a head 58 having a hollow interior at 59 (well seen in the dotted device of Fig. 1) adapted to receive the pins respectively, the head 58 being mounted on a rod 60 adjustably mounted on the arm 61, which arm 61 is connected to a segmental gear 62 intermeshing with a second segmental gear 63, and each of the segmental gears 63 carries an arm 64 adapted to engage a cam whereby the presser foot 58 is alternately raised and lowered in timed relation to the travel of the reciprocating layer 35. The cam 65 has its cam surface so arranged that it will force the arm 64 to the left as shown in Fig. 1, the position illustrated showing the arm 64 as just having been released from the cam surface 65ª allowing the presser foot 58 to fall into the position shown, the carrier arm 35 at this time being assumed to be moving toward the right as seen in Fig. 1. The cam 66, seen in side view by dotted lines in Fig. 4, is designed to raise the arm 64 associated with it. These cams 65 and 66 are mounted upon the shaft 67 which carries a bevel gear 68 intermeshing with the bevel gear 69 on the main driving shaft 12. The relation of the last mentioned gears 68 and 69 to each other is such that a complete revolution of the gear 68 is made for each revolution of the pitman gear 14 so that with each complete reciprocation of the layer device 35 each of the two presser feet 58 is raised and lowered, the raising of each being just before the fabric reaches the pin and the lowering occurring just after the fabric has begun to be laid in the opposite direction.

From Fig. 5 it will be observed that the rollers 40 and 41 are provided with grooves 40ª and 41ª respectively. The sharp pins 50 and 51 are in the path of movement of these grooves in the rollers. The lower operative surfaces of the rollers extend below the points of these catching pins, and the result is that the fabric is laid and pressed down positively upon the pins 50 and 51 by the rollers.

It will thus be seen that the laying of the fabric continues automatically until the desired thickness of plies is obtained. At such time the driving belt 10 (Figs. 2 and 4) is shifted upon the second driving wheel 70, by the belt shift 71 and thereupon the laying mechanism ceases to operate and the cutting mechanism is placed in operation.

*Fabric cutting mechanism.*—The driving pulley 70 (Figs. 2 and 4) is loosely mounted upon the main driving shaft 12. This pulley 70 carries a sprocket 72 on the hub thereof, and an endless chain belt 73 thereon communicates rotative motion to the sprocket 74 on the shaft 75. This shaft 75 carries a substantially wide pulley 76, accommodating the belts 77 and 78. The belt 77 is shown as twisted a half turn, to reverse direction, and operates upon the pulley 79 loosely mounted upon the shaft 80. The belt 78 is not twisted and operates upon the pulley 81, also loosely mounted upon the shaft 80. Between the pulleys 79 and 81 is the pulley 82, rigid upon the shaft 80. These belts are shifted through the operation of the hand levers 83 and 84, communicating respectively with the belt shifting jaws 85 and 86 (Fig. 3). From this construction, it will be clear that when either the belt 77 or 78 is shifted upon the intermediate pulley 82 rigid upon the shaft 80 this shaft 80 will be rotated, and its direction of rotation will be one way or the other according to which of the two belts is thus upon the pulley 82.

The shaft 80 carries a pulley 88 on which is a belt 89 operating upon the pulley 90, shown by dotted lines in Fig. 2, which pulley 90 is rigid upon the screw shaft 91 journaled in relatively fixed parts of the machine. Parallel with the screw shaft 91 is the shaft 93 and these two shafts 91 and 93 carry a frame 94 (Fig. 7) in which is journaled the mandrel 95 carrying the circular knife 96. The screw shaft 91 is threaded into the frame 94, as well seen in Fig. 7. Rotative power is communicated from the screw shaft 91 to the shaft 93 by the gears 98 and 99 on these shafts respectively. Carried by the frame 94 (Fig. 7) is a bevel gear 100 splined upon the shaft 93, the spline groove in the shaft 93 extending substantially from one end to the other of the shaft, and an intermeshing bevel gear 101 on the knife shaft or mandrel 95 communicates rotative power to the knife 96. It will thus be seen that when the screw shaft 91 is rotated, it will carry the knife frame 94 from one end of the screw shaft to the other, and with it the knife 96, and that throughout its movement the knife will be constantly rotated.

During this movement of the knife 96, it passes through a slot 103 in the table or platform 30, and thus the knife divides the fabric at this slot 103.

In order to hold the plies of fabric tightly upon the table 30 during the cutting operation, I provide a frame 105, well seen in Fig. 4, which is carried by the shaft 106 at the outer end of which is the hand lever 107. By moving the hand lever 107, this frame is lowered upon the fabric. The frame 105 carries a presser foot 108 which is substantially U-shaped, as well seen in Fig. 1, to provide clearance for the knife 96 while providing pressure upon the fabric at each side of the knife during the cutting operation. This frame 105 and presser foot 108 are held upon the fabric by a spring catch 109, shown in dotted lines in Fig. 3.

It will thus be seen that through the operation of the levers 83 and 84 the knife 96 is caused to rotate and to travel in the cutting operation from one edge of the fabric to the other, the direction of movement being dependent upon which of the levers is used to rotate the screw shaft 91 in one direction or the other.

*Fabric releasing mechanism.*—By reference to Fig. 8 it will be noted that upon the support 52 for the pin 50 there is provided a plate 110 having a slot 111 through which this pin projects. The slot just mentioned permits of the adjustability of the pin 50 by the screw shaft 56. At the ends of the plate 110, I provide the depending arms 113 and beneath them is an extension 114 of the foot lever 115, well seen in Fig. 1, the foot lever terminating in a pedal 116. The construction of Fig. 8 is duplicated for the sharp pin 51, as will be noted from Fig. 1, where the same reference numerals for the same parts are given. From this construction it will be seen that by stepping on either of the pedals 116 the fabric will be pushed upward off of the pin with which that pedal is associated.

The construction of the machine may be according to well-known practices and materials commonly employed in machines of the general character described.

I claim:

1. A fabric layer for a device of the character described, comprising in combination a pair of arms in substantially parallel arrangement and spaced apart to receive the fabric between them, one of said arms being mounted to move away from the other thereof to provide space for inserting and removing the fabric, and means for holding said arms in their substantially parallel operative relation.

2. A fabric layer for a device of the character described, comprising in combination a pair of rollers in substantially parallel arrangement and spaced apart to admit the fabric between them, means for separating the rollers to provide space for inserting and removing the fabric, and means for holding the rollers in their operative substantially parallel relation.

3. A fabric layer for a device of the character described, comprising in combination a pair of arms in substantially parallel relation and spaced apart to accommodate the fabric between them, one of said arms being pivotally mounted at its end so as to swing away from the other thereof to provide space for inserting and removing the fabric, and means for holding the relatively movable arm in its substantially parallel relation with the other arm.

4. A fabric layer for a device of the character described, comprising in combination a pair of rollers in substantially parallel arrangement and spaced apart to admit fabric between them, and a protective guard associated with each roller for maintaining the rollers respectively against being enwound by loose threads of the fabric.

5. In a fabric-folding device, the combination of a table for supporting the folded fabric, a fabric-laying device mounted to reciprocate in spaced apart relation to the table, means for reciprocating the fabric-laying device, and means including spaced-apart projecting pins and fabric-retaining means associated therewith respectively for automatically engaging the fabric and holding same at each end of the path of movement of said reciprocating device.

6. In a fabric-folding device, the combination of a table for supporting the folded fabric, a fabric-laying device including a pair of arms in substantially parallel arrangement and spaced apart to receive the fabric between them, said arms being mounted to reciprocate in spaced-apart relation to the table, a sharp pin projecting from the table near each end of and within the path of movement of the reciprocating device for catching the fabric, the distance from the table adjacent to said pins to the plane of reciprocating movement of the side of said arms facing the table being less than the distance from the table to the points of said pins respectively whereby said fabric-laying device will positively impress the fabric upon said pins.

7. In a fabric-folding device, the combination of a table for supporting the folded fabric, a fabric-laying device including a pair of arms having rollers in substantially parallel arrangement and spaced apart to receive the fabric between them, said arms being mounted to reciprocate in spaced-apart relation to the table, a sharp pin projecting from the table near each end of and within the path of movement of the reciprocating device for catching the fabric, the distance from the table adjacent to said pins to the plane of reciprocating movement of the side of said arms facing the table being less than the distance from the table to the points of said pins respectively whereby said fabric-laying device will positively impress the fabric upon said pins, said rollers being grooved to provide clearance for the pins whereby the rollers may pass beyond the pins in their path of reciprocating movement.

8. Means for holding successive plies of fabric in a fabric-folding machine, comprising in combination a sharp pin for penetrating the fabric, and a presser foot associated with said pin, together with means for periodically moving said presser foot into and out of pressing relation with the fabric on the pin.

9. In a fabric-folding machine, the combination of a sharp pin for catching the respective plies of the fabric as folded, and mechanical means operatively associated with the pins and under the control of the operator for releasing the fabric from the pin.

JOZEPH GOCH.